United States Patent
Ono et al.

(10) Patent No.: US 7,689,104 B2
(45) Date of Patent: Mar. 30, 2010

(54) RECORDING/PLAYBACK DEVICE, RECORDING DEVICE, AND RECORDING/PLAYBACK METHOD

(75) Inventors: Hiroaki Ono, Fujisawa (JP); Tatsuya Ishitobi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1198 days.

(21) Appl. No.: 11/186,916

(22) Filed: Jul. 22, 2005

(65) Prior Publication Data
US 2006/0176792 A1     Aug. 10, 2006

(30) Foreign Application Priority Data
Feb. 7, 2005 (JP) ............................. 2005-029956

(51) Int. Cl.
| H04N 5/00 | (2006.01) |
| H04N 9/00 | (2006.01) |
| H04N 11/00 | (2006.01) |
| H04N 5/91 | (2006.01) |
| H04N 7/00 | (2006.01) |
| H04N 7/26 | (2006.01) |
| G11B 21/08 | (2006.01) |
| G11B 7/085 | (2006.01) |
| G11B 7/24 | (2006.01) |

(52) U.S. Cl. .................. 386/126; 386/1; 386/46; 386/124; 386/125; 369/275.1; 369/275.2; 369/275.3; 369/30.01; 369/30.19

(58) Field of Classification Search ... 369/30.01–30.19, 369/47.13, 275.1, 275.3, 94; 386/52, 125, 386/126, 1, 46
See application file for complete search history.

(56) References Cited

U.S. PATENT DOCUMENTS

| 6,263,150 | B1 * | 7/2001 | Okada et al. .................. 386/52 |
| 6,370,091 | B1 * | 4/2002 | Kuroda ..................... 369/30.08 |
| 6,618,548 | B1 * | 9/2003 | Inoue et al. .................... 386/52 |

FOREIGN PATENT DOCUMENTS

| CN | 1204837 A | 1/1999 |
| JP | 11-045518 | 2/1999 |
| JP | 2001-024929 | 1/2001 |
| JP | 2001-202274 | 7/2001 |
| JP | 2002-344892 | 11/2002 |
| JP | 2004-206849 | 7/2004 |

OTHER PUBLICATIONS

Chinese Office Action dated Nov. 7, 2008.
Japanese Office Action dated Jan. 27, 2009.

* cited by examiner

*Primary Examiner*—Marsha D Banks Harold
*Assistant Examiner*—Marc Dazenski
(74) *Attorney, Agent, or Firm*—McDermott Will & Emery LLP

(57) ABSTRACT

A recording/playback device includes an information conversion unit converting video or audio information, received from an external source, to video or audio data for recording on a rewritable optical disk, a recording unit recording the video or audio data on said optical disk, and a playback unit playing back the video or audio data recorded on said optical disk, in which the optical disk has at least two recording layers and, when the video or audio data is recorded in two or more layers of the optical disk and then a part of the video data or audio data recorded in each layer is erased, a part of the video or audio data left unerased is moved so that a number of layers, in which the video or audio data left unerased is recorded, is reduced.

14 Claims, 3 Drawing Sheets

MOVE TO OTHER R ZONE

MOVE WITHIN SAME R ZONE

MOVE TO OTHER R ZONE

RECORDING/PLAYBACK DEVICE, RECORDING DEVICE, AND RECORDING/PLAYBACK METHOD

INCORPORATION BY REFERENCE

The present application claims priority from Japanese application JP2005-029956 filed on Feb. 7, 2005, the content of which is hereby incorporated by reference into this application.

BACKGROUND OF THE INVENTION

1. Field of the Invention

The present invention relates to a recording/playback device, a recording device, and a recording/playback method for recording data on a multi-layer optical disk.

2. Description of the Related Art

There have been a method for recording multiple channels of video or audio data on an HDD (Hard Disk Drive) recorder and a method for recording still image information in two compression methods in a digital camera as conventional art. Examples of those methods are disclosed in JP-A-2002-344892 and JP-A-2001-24929. However, they do not correspond to technologies for recording data on a multi-layer optical disk.

SUMMARY OF THE INVENTION

The recent tendency to digitize video and audio data in the video and audio information industry and the recent advance in the video and audio data compression technology are rapidly replacing tape storage, such as a VTR, with disk storage such as a DVD and a hard disk drive (HDD). A typical such storage medium is an HDD&DVD hybrid recorder in which a hard disk drive (hereinafter called an HDD) and a DVD drive are mixed. Digitization penetrates also into home video cameras with the storage medium shifted from a tape to a disk recording device such as a DVD. A DVD disk has a capacity of about 4.7 G bytes. A typical DVD disk is a digital video disk (hereinafter called a DVD-Video) that is an optical disk for videos such as a movie and a DVD-ROM used on computers for recording application software, game software, and various types of data. There are also rewritable optical recording media using optical disks, such as a DVD-RAM, a DVD±RW, and a DVD±R. They are used for backing up personal information, used on a DVD recorder that is a replacement for a VTR, and used on a DVD camera.

On the other hand, as a high-definition video or audio content such as that of a hi-vision broadcast, including a digitalized terrestrial broadcast, is becoming to be delivered, a need has arisen for recording high-quality image and sound information. However, high-quality image or sound information requires a large amount of information. For example, according to the conventional MPEG2 technology, SD-quality image data with audio requires the maximum information amount of 4.7 G bytes for a 2-hour program, if the data is recorded using variable-length records at the average rate of about 5 M bps with the maximum rate of 10 M bps. This amount of data can be recorded on one 12-cm DVD disk. However, for an HD-quality digitalized terrestrial broadcast, the average recording rate cannot fall below 15 M bps because the balance with the image quality must be maintained at the compression rate of the conventional MPEG2. Therefore, a 2-hour program cannot be recorded on one DVD disk. In the near future, even if a Blue-ray disk becomes widely used and an optical disk medium with a capacity of 25 G bytes or more per disk becomes available, a video content longer than 2 hours and a half cannot be recorded on one disk in the high-quality image mode that requires a recording rate of, for example, 25 M bps. To record such a content on one optical disk, the tendency of both a DVD and a Blue-ray disk is toward multi-layering for increasing the capacity.

Meanwhile, the recent advance in the compression technology, for example, H.264 codec of MPEG4, gives sufficient HD-quality data even at a recording rate of as low as 8 M bps, while the recording rate of 25 M bps is required to give the same HD-quality data in the conventional MPEG2. At the same time, fairly good SD-quality data can be obtained even at 2.5 M bps. In addition, when the digitalized terrestrial broadcast becomes popular, there will be a case where the broadcasts of several channels are recorded at the same time and those multiple contents are recorded on one disk. In such a case, the user may want to edit multiple recorded contents as the user desires. When high-compression technology and disk multi-layering are employed for a home video camera, the recording time of one disk becomes longer and, at the same time, one disk contains an extremely large number of scenes. This means that, in most cases, the user will edit recoded videos at a later time.

As described above, a high-definition video or audio content such as that of a hi-vision broadcast, including a digitalized terrestrial broadcast, is becoming to be delivered, and a need has arisen for recording high-quality image and sound information and for recording multiple channel contents at the same time. A multi-layer recording medium becomes popular as a recording disk to increase the recording capacity per disk. In addition, as multiple channel recording becomes more popular, there will be a case where the user edits the content. Also, a camera user edits a content shot by himself.

However, when multiple channel contents are recorded on a multi-layer recording medium and then those multiple channel contents are edited, the optical pickup moves on the disk while jumping to various positions and performing a layer jump to various layers to carry out the editing task. It is not easy to carry out the editing task on a multi-layer recording medium with an optical pickup that takes time to move because of its mass. Especially, when the user edits a content, the optical pickup takes time to move on the disk depending upon the editing method, sometimes preventing the edited content from being played back in real time. This problem is fatal to cameras that require frequent editing.

It is an object of the present invention to provide a multi-layer medium recording/playback device and a multi-layer recording medium recording/playback method that edit a content recorded on a multi-layer recording medium so that the content can be played back in real time.

To achieve the above object, a recording/playback device and a recording/playback method for a multi-layer medium according to the present invention, provided for use when recorded contents are edited, for example, when multiple contents (multiple scenes for camera shooting) are recorded on a multi-layer recording medium while moving an optical head between layers (layer jump) and then a part of the contents is erased or a part of the playback sequence is changed, change the allocation of edited contents according to the edited status by reallocating a part of the edited part or multiple recorded parts on the disk and record the reallocated contents on the disk.

The object described above is achieved by the invention described in the claims.

The recording/playback device and a recording/playback method according to the present invention reduce the movement of the optical pickup and allow the contents to be played back in real time even if the contents recorded on the multi-layer medium are edited.

Other objects, features and advantages of the invention will become apparent from the following description of the embodiments of the invention taken in conjunction with the accompanying drawings.

DETAILED DESCRIPTION OF THE EMBODIMENTS

First Embodiment

One embodiment of the present invention will be described with reference to FIG. 1, FIGS. 2A, 2B, and 2C, FIGS. 3A and 3B, and FIGS. 4A and 4B.

Figure 1:
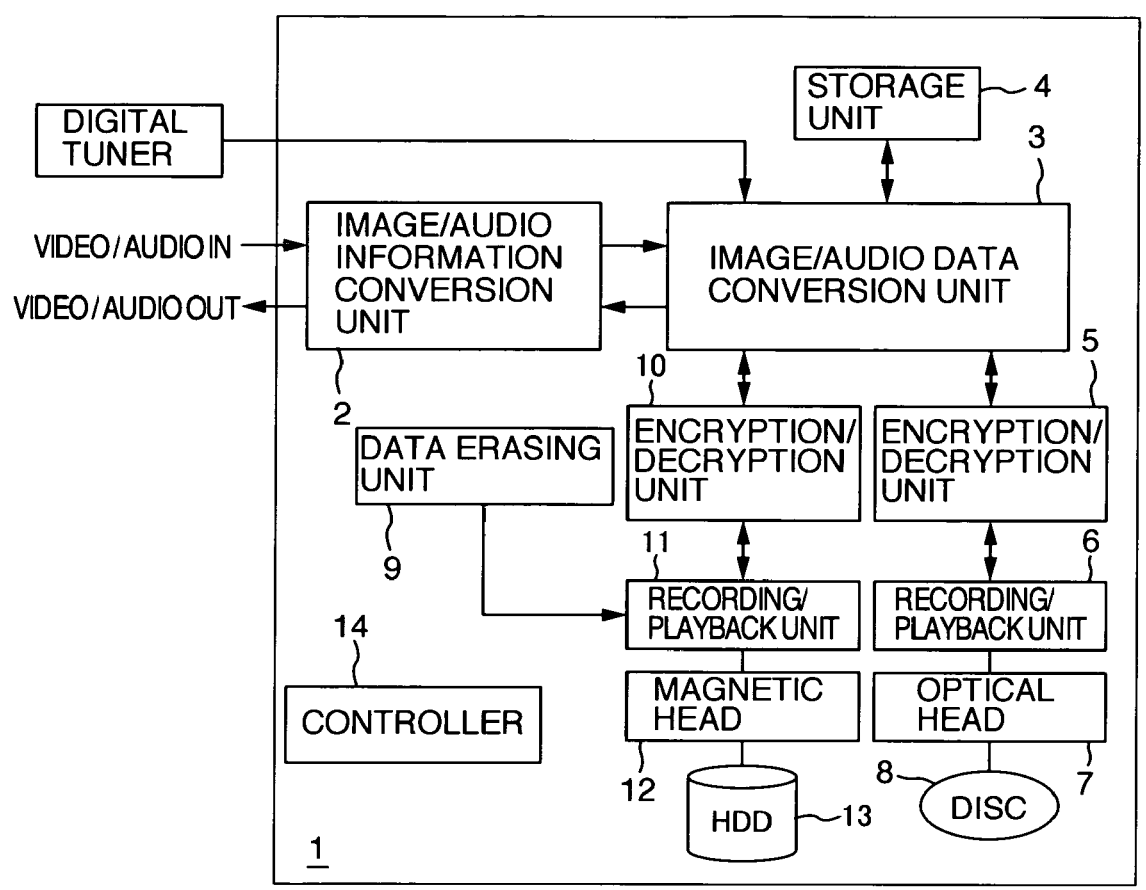
FIG. 1 is a system block diagram of one embodiment of the present invention.

FIG. 1 shows the general configuration of a multi-layer medium recording/playback device 1 (in the dotted line in the figure) in one embodiment of the present invention.

An image/audio information conversion unit 2 compresses and encodes an external analog signal, such as Video IN, into the MPEG format (MPEG2, MPEG4, H.264 format) for converting image or audio information into digital data or decodes digital data and converts it into an analog signal for outputting it from an external analog terminal, such as Video OUT, to a monitor. Although the configuration of a home video camera is not shown in the figure, the image/audio information conversion unit 2 compresses and encodes an analog signal, received from a shooting unit such as a lens via a shooting element CCD, into the MPEG format for converting image or audio information into digital data or decodes digital data into an analog signal for output it to a monitor such as an LCD.

An image/audio data conversion unit 3 is means for converting digitized video or audio data into data to be written on a recording medium such as an HDD or an optical disk. The unit adds an ECC to, and modulates or demodulates, the data according to the disk device. A signal received from a digitalized terrestrial broadcast tuner, which is already in the digital format, is input directly to the image/audio data conversion unit 3.

When the video or audio information is recorded on an HDD and the information is copyright-protected, an encryption/decryption unit 10 encrypts the information and an HDD recording/playback unit 11 records the information on a hard disk 13 via a magnetic head 12. When the video or audio information is recorded on an optical disk and the information is copyright-protected, an encryption/decryption unit 5 encrypts the information and an optical disk recording/playback unit 6 records the information on an optical disk 8 via an optical head 7. A controller 14 controls the whole operation.

Figure 2A:
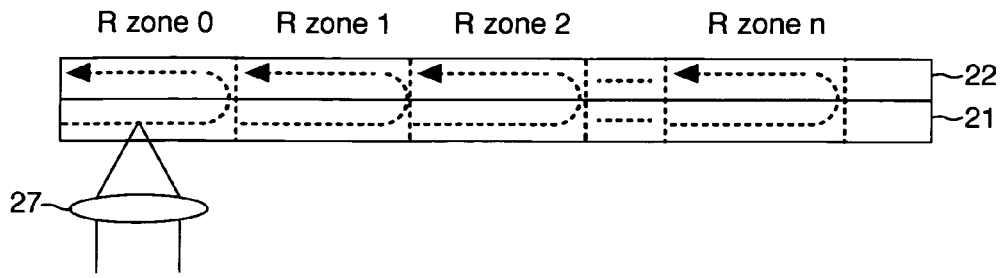
FIGS. 2A, 2B, and 2C are diagrams showing how data is recorded on a standard multi-layer recording medium.
Figure 2B:
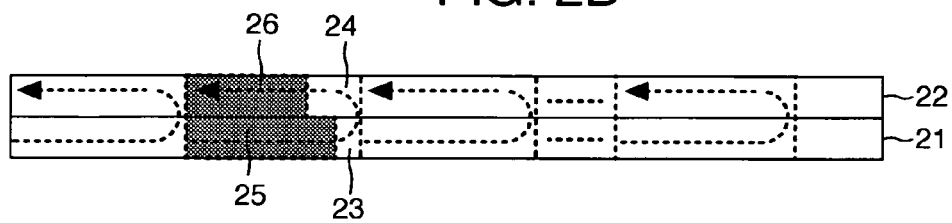
Figure 2C:
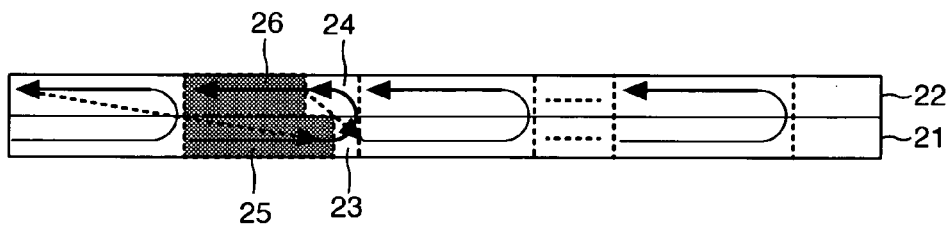

Next, how an optical head records information on a multi-layer optical disk will be described with reference to FIG. 2A, FIG. 2B, and FIG. 2C. Although an optical disk with two recording layers is shown in the figure, the description is applied to a multi-layer optical disk that has two or more layers. Referring to FIG. 2A, an optical head 27 is below a bottom layer 21 of the disk with the left side of the figure corresponding to the inner side. An R zone shown in FIG. 2A is a recording unit by which a content or a scene is recorded on the disk. For each R zone, information is recorded in the bottom layer 21 of the disk from the inner side to the outer side and, after a layer jump, the information is written in a top layer 22 of the disk from the outer side to the inner side. When recording in the R zone is terminated, recording proceeds to a new R zone and information is sequentially recorded as described above.

Referring to FIG. 2A, information is recorded in the R zones sequentially from the inner side to the outer side in order of R zone 0, R zone 1, and so on. FIG. 2B shows that, as a result of user editing, some R zone (R zone 1 in the figure) is divided into the following parts: part A25 that is cut during the editing of the first recording layer of the R zone, part B26 that is cut during the editing of the second recording layer of the R zone, part A23 that is left uncut during the editing of the first recording layer of the R zone, and part B24 that is left uncut during the editing of the second recording layer of the R zone. Assume that the parts that are cut (parts 25 and 26 in the figure) are logically erased. This disk is played back as shown in FIG. 2C; that is, after playing back R zone 0, the optical head performs a seek and a layer jump to play back the part A23 left uncut during the editing in the first recording layer in R zone 1 and the part B24 left uncut during the editing of the second recording layer in R zone 1. After that, the optical head performs a seek and a layer jump to move to R zone 2 to continue the playback. In this case, the following condition is applied.

$$A > R1(J1 \times N + \Sigma Si)$$

where
Minimum playback speed of disk determined by specification: R1 (M bps)
Time required for one layer jump: J1 (seconds)
Number of required layer jumps: N
ith seek time: Si (seconds)
Size of buffer used for playback: A (M bits)

If the above condition is exceeded, data recorded in two layers is re-recorded in one layer. The above condition indicates a condition for reading playback data from the disk after the playback buffer of a predetermined size A is filled with playback data but before the playback data is output and the playback buffer becomes empty.

In the above expression, $\Sigma Si$ indicates the total of the seek times S1, S2, . . . , Sn required for the first seek to the nth seek. N is the number of layer jumps occurred during that period. Note that n is not always equal to N. R1 is the minimum playback speed defined by the specification, and the actual device may play back information at a faster speed. A indicates the buffer memory size of the device used for playback. If this size is large, the above condition is satisfied in most cases. However, because a larger buffer increases the cost, an appropriate size must be selected. Thus, depending upon the editing method, information is erased or divided based on a small recording unit and, in that case, the above condition may not be satisfied. Therefore, to satisfy the above condition, the divided information must be reallocated. The following describes how the divided information is reallocated.

Figure 3A:
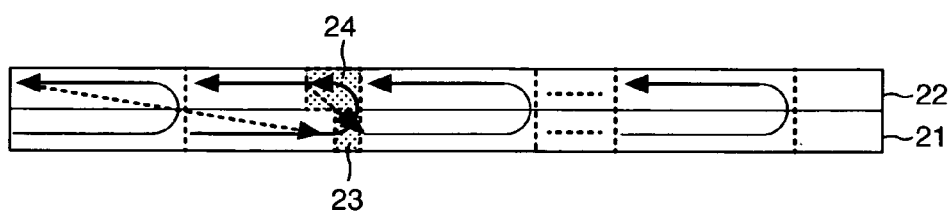
FIGS. 3A and 3B are diagrams showing how data is recorded on a multi-layer recording medium in one embodiment of the present invention.
Figure 3B:
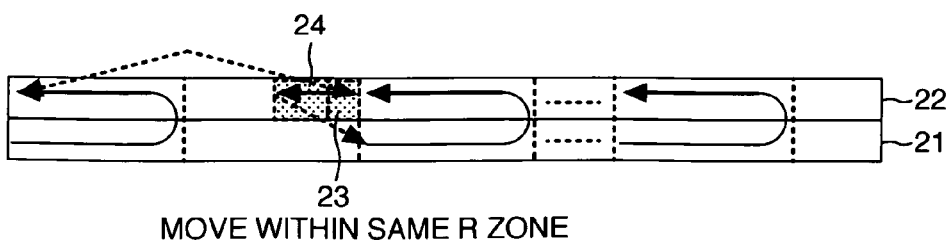

FIGS. 3A and FIG. 3B show how information that is left uncut is moved on the disk in order to satisfy the condition given above. FIG. 3A shows that information is played back while performing layer jumps. If the above condition is not satisfied during this playback, the part left uncut during the editing is moved to a part logically erased part in the same R zone as shown in FIG. 3B. Logical erasure refers, not to the erasure in which data is actually erased using an erasure power, but to the erasure in which data is erased logically. Referring to FIG. 3B, part B24 that is left uncut during the editing of the second recording layer in R zone 1 is moved to create space large enough to store part A23 that is left uncut during the editing of the first recording layer in the same recording layer. After that, part A23 is moved to the second layer side so that the condition given above is satisfied. In the examples shown in FIG. 3A and FIG. 3B, though part B24 that is left uncut during the editing of the second recording layer is also moved in the same recording layer, this part is not always moved. That is, if the condition given above is satisfied, this part need not be moved.

The second recording layer is only required to have space large enough to store part A23, which is left uncut during the editing in the first recording layer, whether the space is created by moving part B24 that is left uncut in the second recording layer or the space is an area from which data is erased during the editing in the second recording layer.

As described above, when data was erased, data is moved to reduce the number of times the data recording/playback optical head performs a seek or a jump so that the number of layers in which data is recorded is reduced. This allows data to be played back more smoothly in real time.

Note that, if the number of layers used for recording is not reduced, data is not moved.

Second Embodiment

Figure 4A:
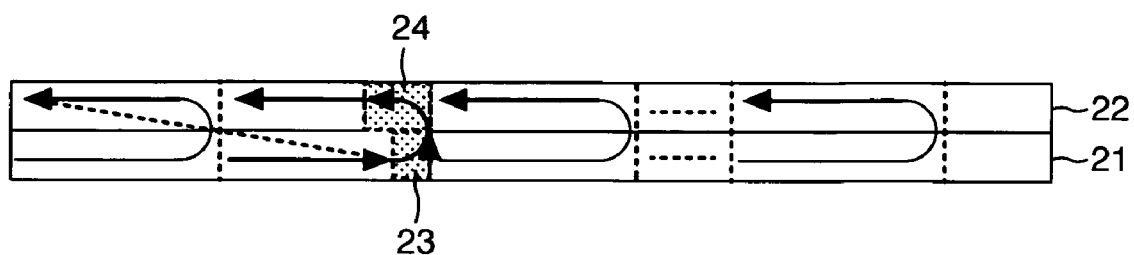
FIGS. 4A and 4B are diagrams showing how data is recorded on a multi-layer recording medium in another embodiment of the present invention.
Figure 4B:
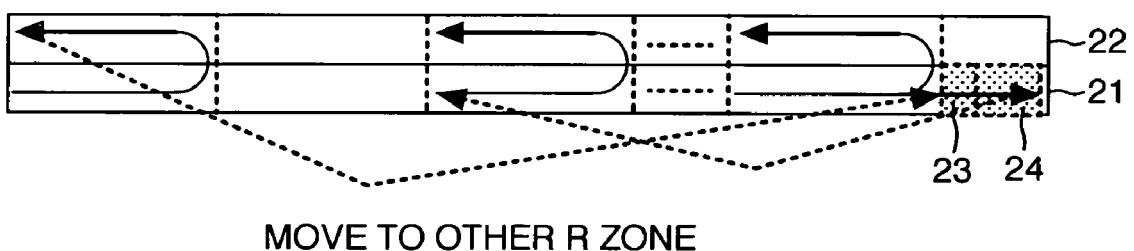

FIG. 4 shows another embodiment of the present invention. Referring to this figure, if data is played back while performing a layer jump as shown in FIG. 4A and the above condition is not satisfied, the information in R zone 1 that is left uncut during the editing is moved to a blank part of some other R zone as shown in FIG. 4B. In the example shown in the figure, though both part A23 that is left uncut during the editing in the first recording layer in R zone 1 and part B24 that is left uncut during the editing in the second recording layer in R zone 1 are moved, both are not always moved. That is, if the condition given above is satisfied, only one of them may be moved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording/playback device comprising:
an information conversion unit converting video or audio information, received from an external source, to video or audio data for recording on an optical disk having at least two recording layers;
a recording unit recording the video or audio data on said optical disk; and
a playback unit playing back the video or audio data recorded on said optical disk,
wherein said optical disk has a plurality of recording zones, each recording zone as a unit of recording includes said recording layers and, the recording unit records the video or audio data sequentially, one recording zone at a time, in two or more recording layers of recording zone, and after the video or audio data is recorded, if in one of the recording zones, a part of the video data or audio data recorded in said recording zone is erased logically, the device moves at least a part of the video or audio data left unerased in said recording zone to a different layer or a different recording zone so that a number of layers, occupied by the video or audio data left unerased, is reduced in said recording zone.

2. The recording/playback device according to claim 1, wherein, when the part of the video or audio data left unerased is moved to the erased part, the part of the video or audio data is moved so that a number of layer jumps for moving between the layers is reduced in said recording zone, said layer jump being performed when the video or audio data left unerased and recorded in two layers is played back.

3. The recording/playback device according to claim 1, wherein, when the part of the video or audio data left unerased is moved to the erased part, the part of the video or audio data is moved to one of the layers where data was erased in said recording zone.

4. A recording/playback device comprising:
an information conversion unit converting video or audio information, received from an external source, to video or audio data for recording on an optical disk having at least two recording layers;
a recording unit recording the video or audio data on said optical disk; and
a playback unit playing back the video or audio data recorded on said optical disk,
wherein said optical disk has a plurality of recording zones, each recording zone as a unit of recording includes said recording layers, the recording unit records the video or audio data sequentially, in two or more layers of a recording zone and after the video or audio data is recorded, if, in one of the recording zones, a part of the video or audio data recorded in said recording zone is erased logically, the device moves at least a part of the video or audio data left unerased in the recording zone to a recording zone on the disk different from the recording zone.

5. The recording/playback device according to claim 4, wherein, when the part of the video or audio data left unerased is moved to the erased part, the part of the video or audio data is moved so that a number of layer jumps for moving between layers is reduced in said recording zone, said layer jump being performed when the video or audio data left unerased and recorded in two layers is played back.

6. The recording/playback device according to claim 4, wherein, when the part of the video or audio data left unerased is moved to the erased part, the part of the video or audio data is moved to one of the layers where data was erased in said recording zone.

7. A recording device comprising:
an information conversion unit converting video or audio information, received from an external source, to video or audio data for recording on an optical disk having at least two recording layers; and
a recording unit recording the video or audio data on said optical disk,
wherein said optical disk has a plurality of recording zones, each recording zone as a unit of recording includes said recording layers the recording unit records the video or audio data in two or more recording layers of a recording zone and after the data is recorded, if a part of the video data or audio data recorded in each layer is erased logically, the device moves at least a part of the video or audio data left unerased in said recording zone to a different recording layer or a different recording zone so that a number of layers, occupied by the video or audio data left unerased, is reduced in said recording zone.

8. A recording/playback method comprising the steps of:

converting, by an information conversion unit, video or audio information, received from an external source, to video or audio data for recording on an optical disk having at least two recording layers;

recording, by a recording unit, the video or audio data on said optical disk; and playing back, by a playback unit, the video or audio data recorded on said optical disk, wherein said optical disk has a plurality of recording zones, each recording zone as a unit of recording includes said recording layers and, when the video or audio data is sequentially recorded in two or more recording layers of a recording zone and then a part of the video data or audio data recorded in said recording zone is erased logically, at least a part of the video or audio data left unerased in said recording zone is moved to a different recording layer or recording zone so that a number of layers, occupied by the video or audio data left unerased, is reduced in said recording zone.

9. The recording/playback device according to claim 8, wherein, when the part of the video or audio data left unerased is moved to the erased part, the part of the video or audio data is moved so that a number of layer jumps for moving between the layers is reduced in said recording zone, said layer jump being performed when the video or audio data left unerased and recorded in two layers is played back.

10. The recording/playback device according to claim 8, wherein, when the part of the video or audio data left unerased is moved to the erased part, the part of the video or audio data is moved to one of the layers where data was erased in said recording zone.

11. A recording/playback method comprising the steps of:

converting, by an information conversion unit, video or audio information, received from an external source, to video or audio data for recording on an optical disk having at least two for recording on an optical disk having at least two recording layers;

recording, by a recording unit, the video or audio data on said optical disk; and playing back, by a playback unit, the video or audio data recorded on said optical disk, wherein said optical disk has a plurality of recording zones, each recording zone as a unit of recording includes said recording layers and, when the video or audio data is sequentially recorded in two or more recording layers of a recording zone and then a part of the video our audio data recorded in said recording zone is erased logically, at least a part of the video or audio data left unerased in the recording zone is moved to some other recording zone on the disk different from the recording zone.

12. The recording/playback method according to claim 11, wherein, when the part of the video or audio data left unerased is moved to the erased part, the part of the video or audio data is moved so that a number of layer jumps for moving between the layers is reduced in said recording zone, said layer jump being performed when the video or audio data left unerased and recorded in two layers is played back.

13. The recording/playback method according to claim 11, wherein, when the part of the video or audio data left unerased is moved to the erased part, the part of the video or audio data is moved to one of the layers where data was erased in said recording zone.

14. A recording method comprising the steps of:

converting, by an information conversion unit, video or audio information, received from an external source, to video or audio data for recording on an optical disk having at least two recording layers; and recording, by a recording unit, the video or audio data on said optical disk, wherein said optical disk has a plurality of recording zones, each recording zone as a unit of recording includes said recording layers and, when the video or audio data is recorded in two or more recording layers of a recording zone and then a part of the video data or audio data recorded in said recording zone is erased logically, at least a part of the video or audio data left unerased in said recording zone is moved to a different recording layer or a different recording zone so that a number of layers, occupied by the video or audio data left unerased, is reduced in said recording zone.

* * * * *